(12) United States Patent
Evansic

(10) Patent No.: US 6,588,581 B1
(45) Date of Patent: Jul. 8, 2003

(54) VIBRATORY APPARATUS HAVING ADJUSTABLE SPRING ASSEMBLY

(75) Inventor: Leonard Evansic, Graceton, PA (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 10/159,662

(22) Filed: May 31, 2002

(51) Int. Cl.[7] .............................................. B65G 27/28
(52) U.S. Cl. ........................ 198/760; 198/266; 198/771
(58) Field of Search ................................ 198/760, 761, 198/763, 769, 266, 771, 762

(56) References Cited

U.S. PATENT DOCUMENTS

| | | | | |
|---|---|---|---|---|
| 2,706,112 A | * | 4/1955 | Carrier | 267/153 |
| 2,854,130 A | * | 9/1958 | Adams | 198/763 |
| 2,985,279 A | * | 5/1961 | Burgess | 198/768 |
| 3,032,175 A | * | 5/1962 | Thomas | 198/763 |
| 3,087,603 A | * | 4/1963 | Petera | 198/763 |
| 3,915,292 A | * | 10/1975 | Brown | 198/763 |
| 3,964,600 A | * | 6/1976 | Vensel | 198/761 |
| 4,128,161 A | * | 12/1978 | Yonkers | 198/761 |
| 4,218,929 A | * | 8/1980 | Spurlin | 74/61 |
| 4,896,762 A | * | 1/1990 | Chang | 198/761 |
| 4,913,281 A | * | 4/1990 | Muller | 198/763 |
| 5,445,261 A | * | 8/1995 | Kimura | 198/763 |
| 5,664,664 A | * | 9/1997 | Gaines | 198/769 |
| 6,116,408 A | * | 9/2000 | Pounds | 198/769 |

OTHER PUBLICATIONS

Product brochure, FMC Syntron BF–4 Vibrating Feeder, pp. 1–6, 2000.
Product brochure, FMC Syntron Light–Capacity Electromagnetic Vibrating Feeders, pp. 1–20, 2001.

* cited by examiner

*Primary Examiner*—Christopher P. Ellis
*Assistant Examiner*—Richard Ridley
(74) *Attorney, Agent, or Firm*—Wood, Phillips, Katz, Clark & Mortimer

(57) ABSTRACT

A vibratory conveying apparatus embodying the principles of the present invention includes a base, a trough, and at least one spring assembly mounting the trough on the base for vibratory conveyance of material in the trough. At least one of the spring assemblies of the conveying apparatus is configured for selective adjustment of the spring rate of the assembly, so that the conveying apparatus can be efficiently tuned for conveying different types of materials, without resort to varying the air gap of the associated electromagnetic vibratory drive, or by otherwise altering spring rates or weight ratios of the conveying apparatus.

14 Claims, 9 Drawing Sheets

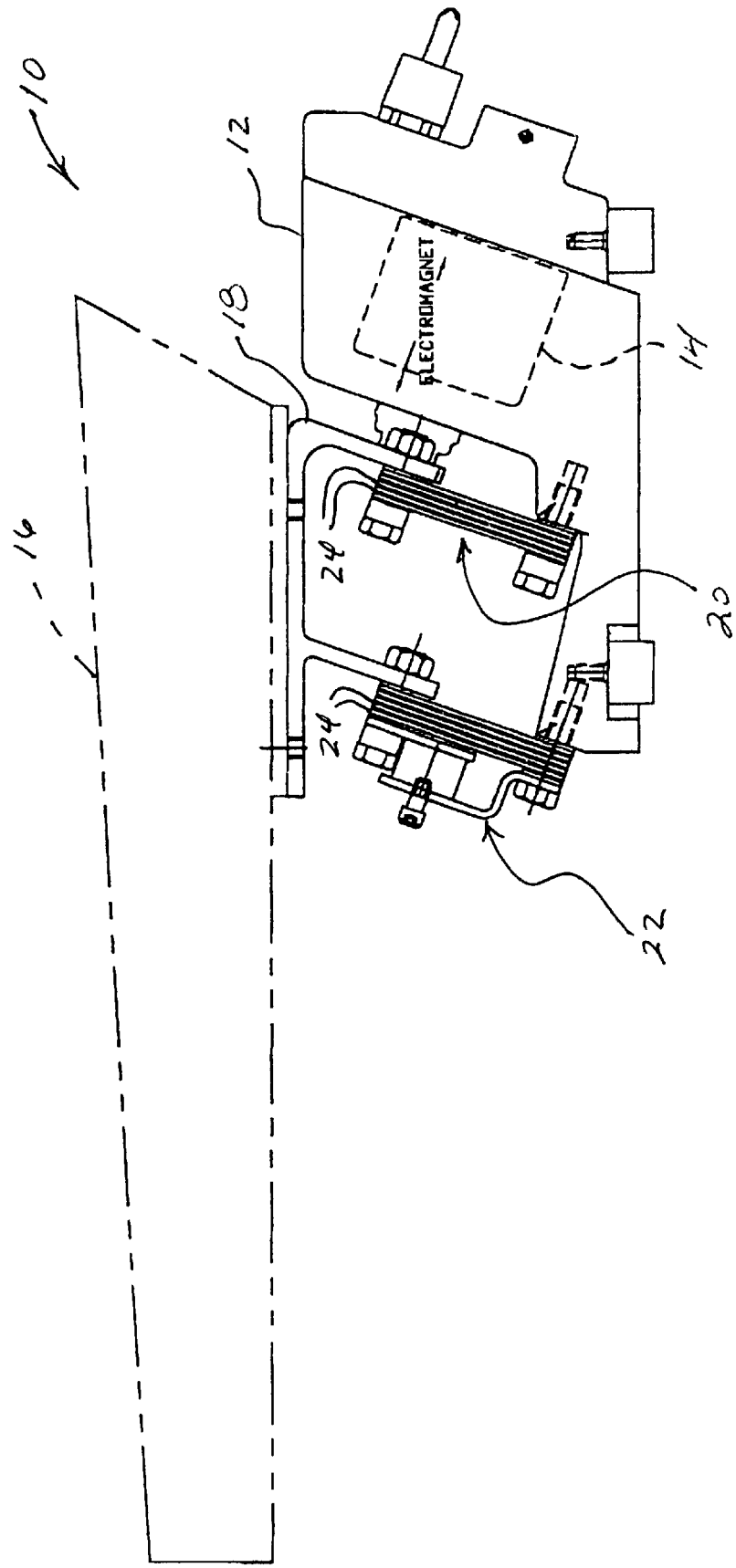
FIG_1

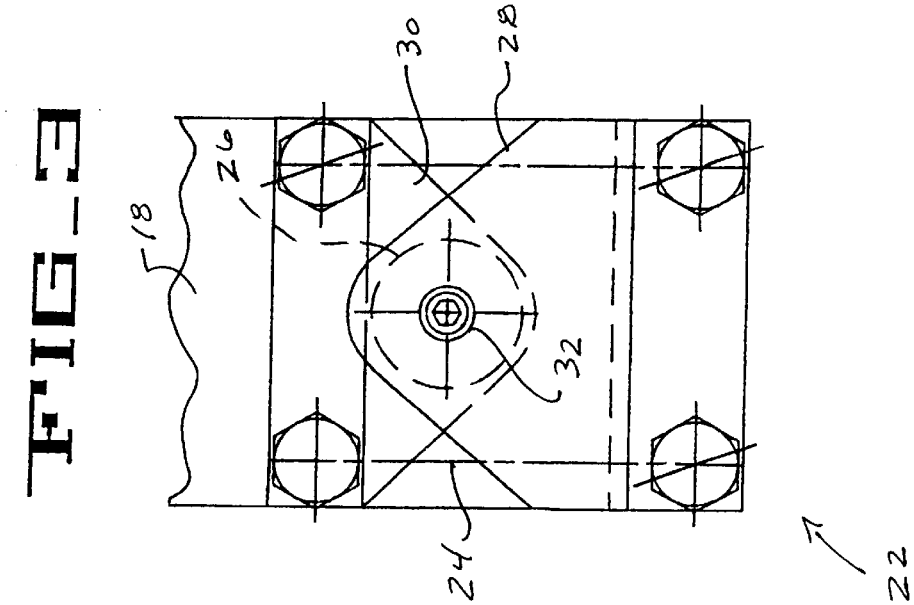
FIG_3
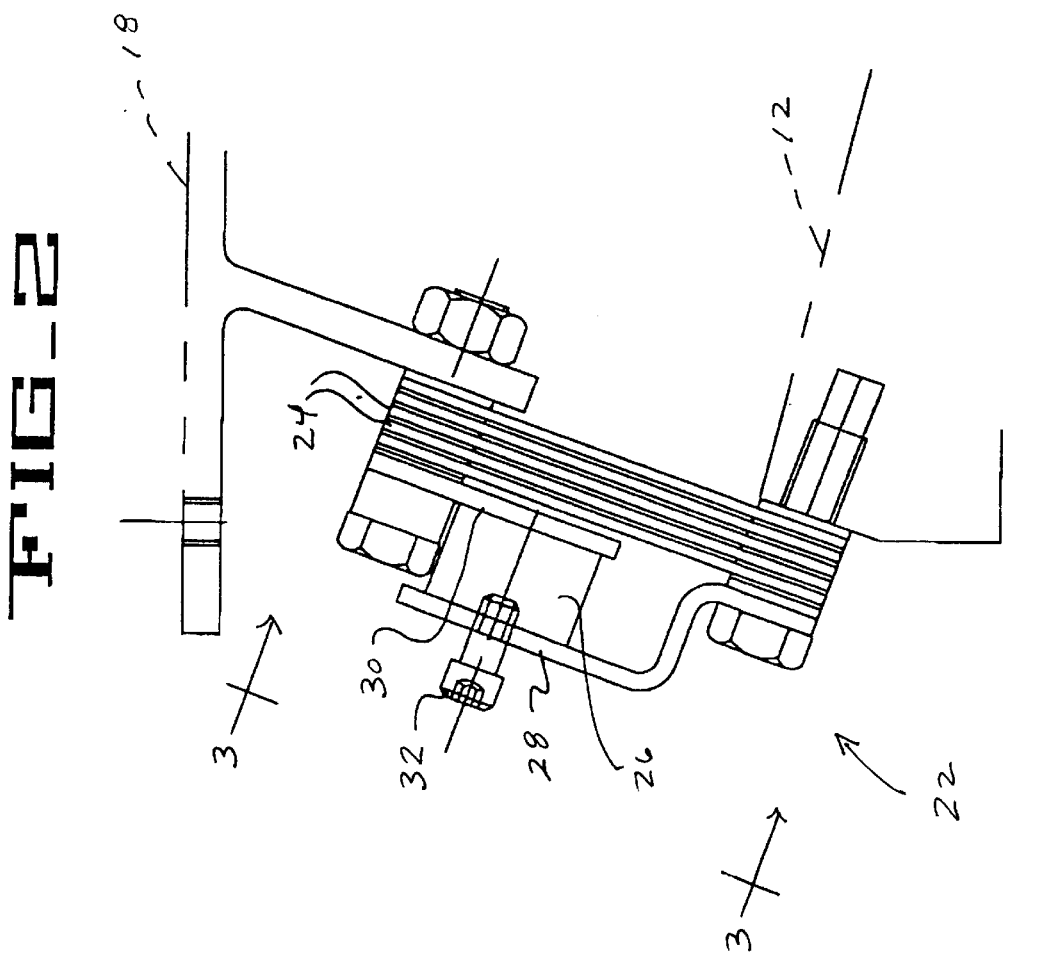
FIG_2

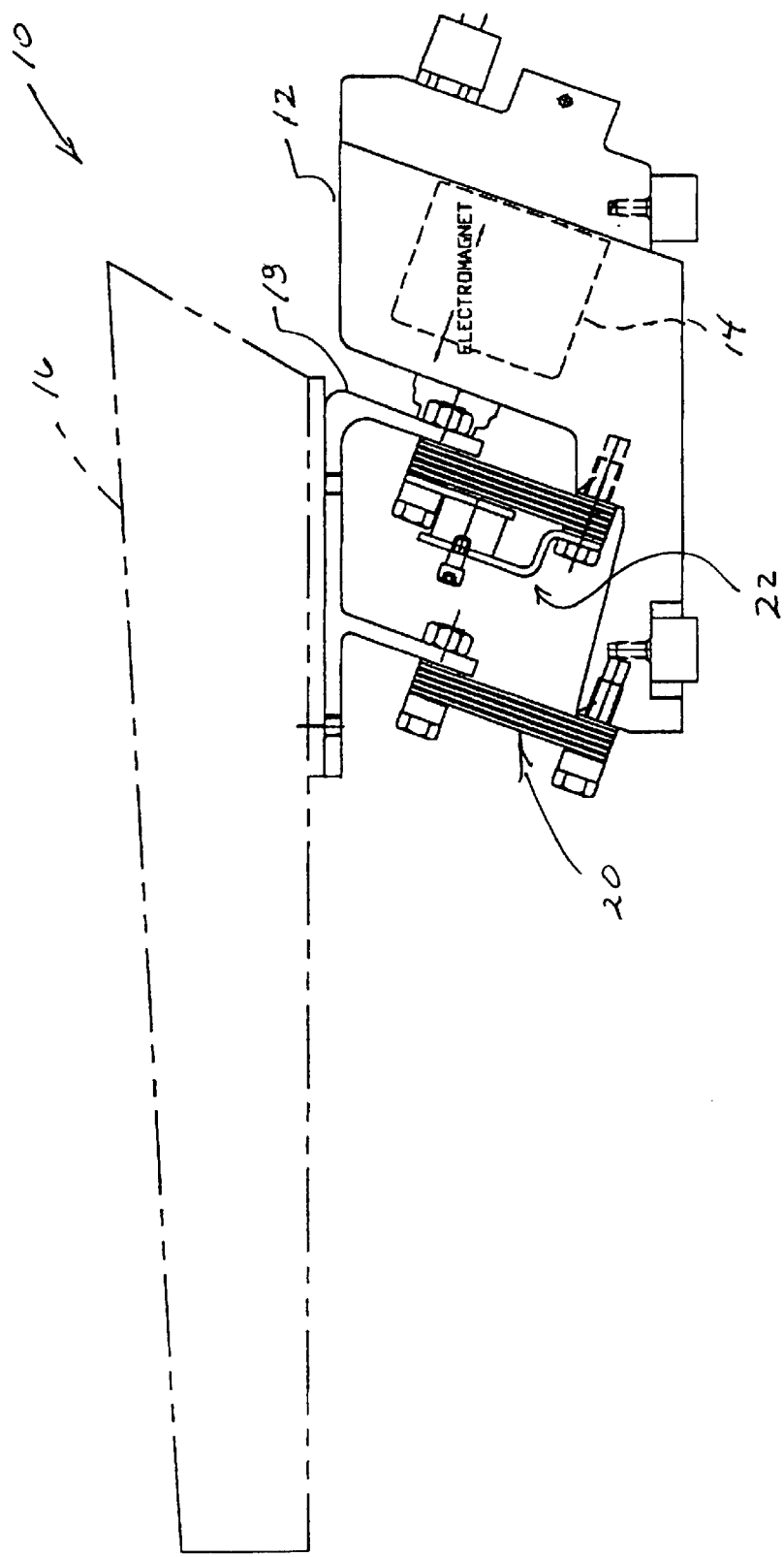

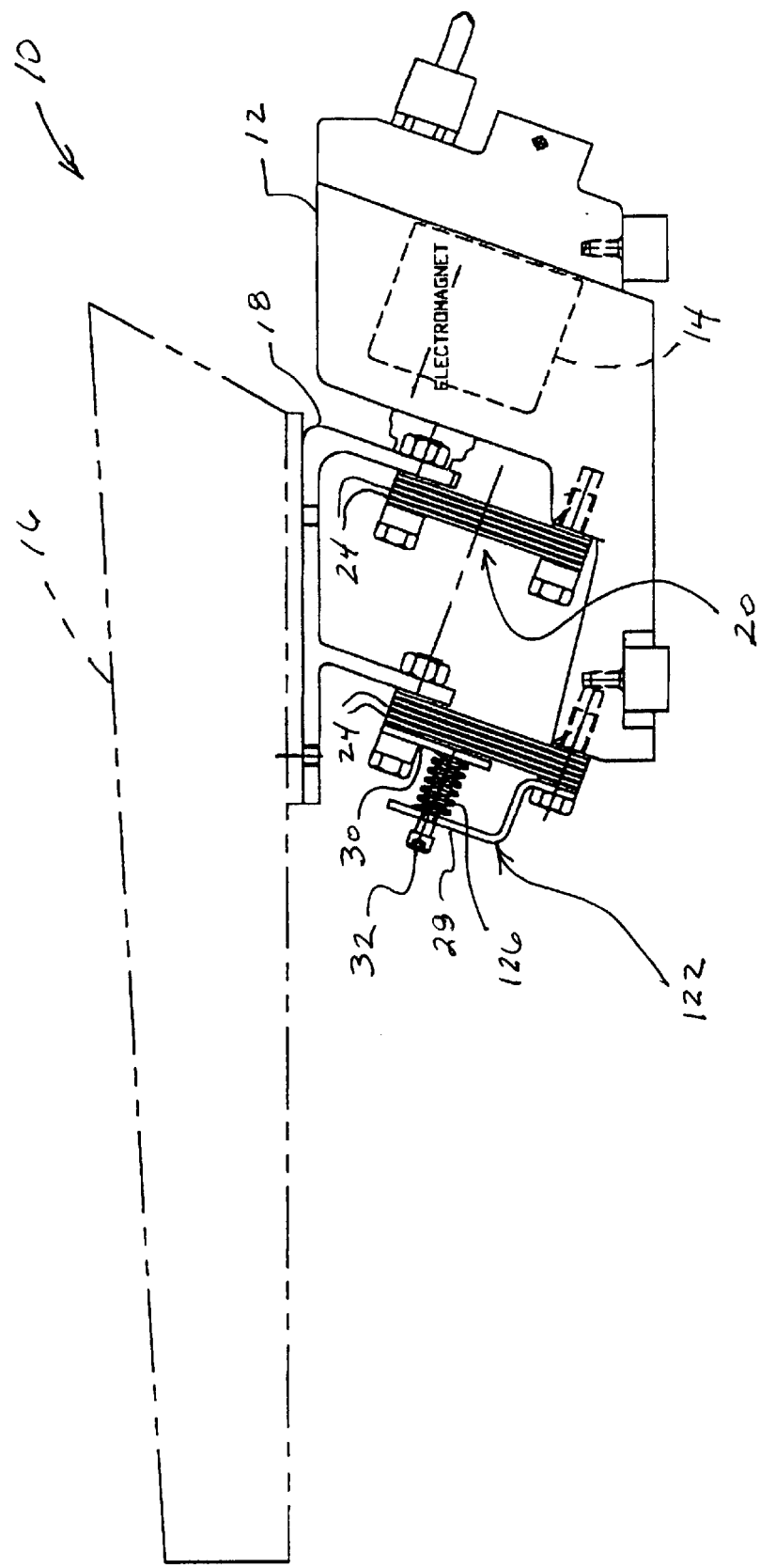
FIG_5

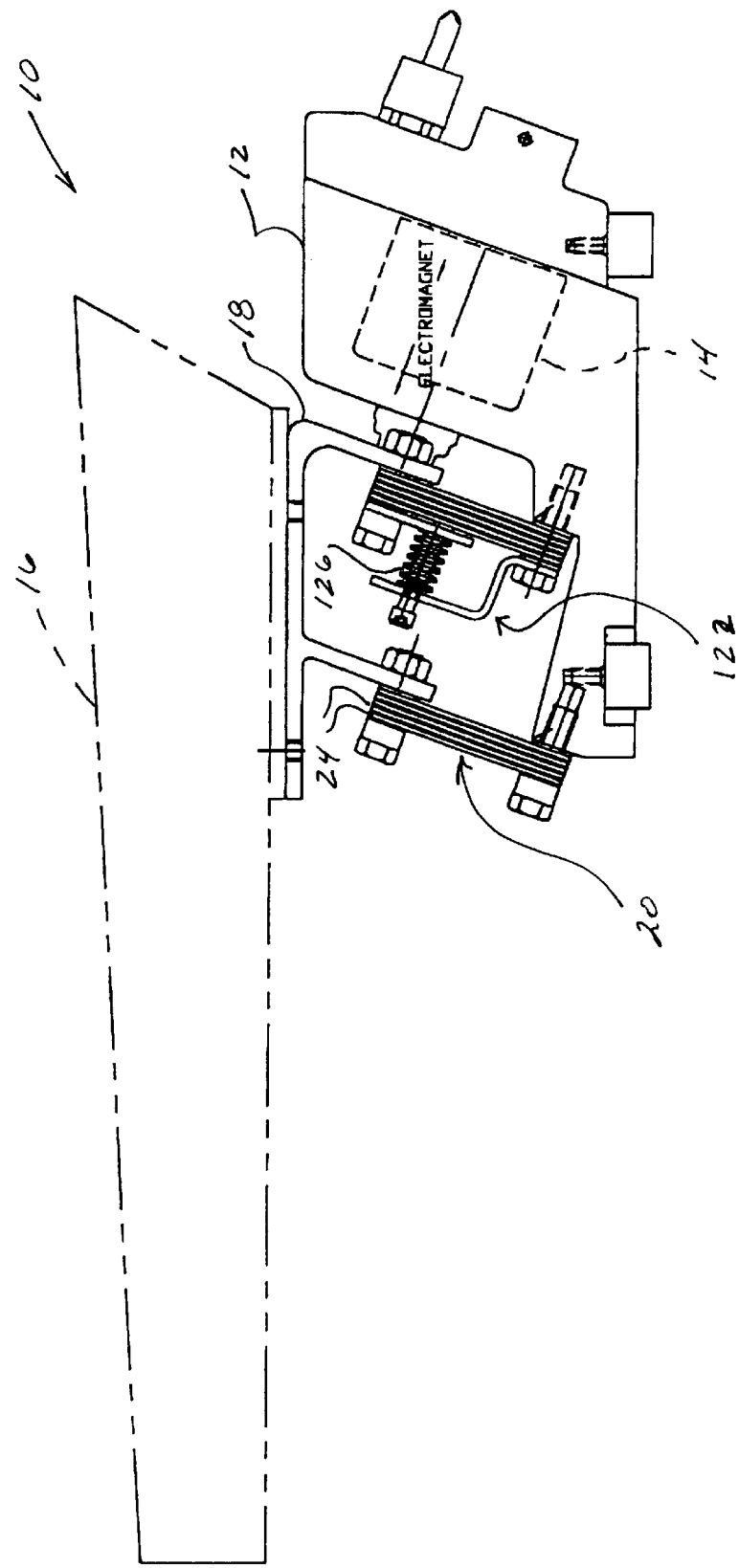

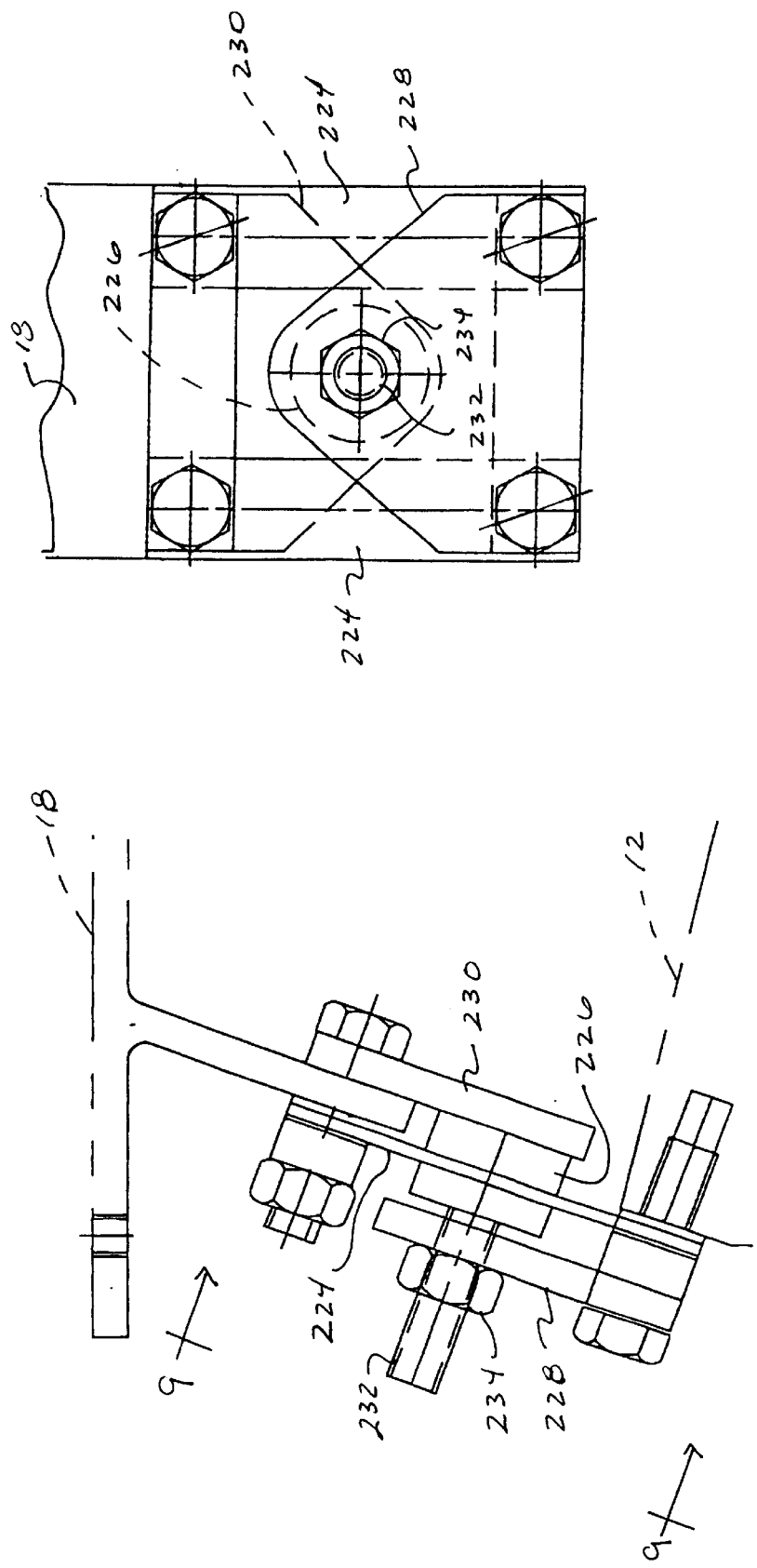

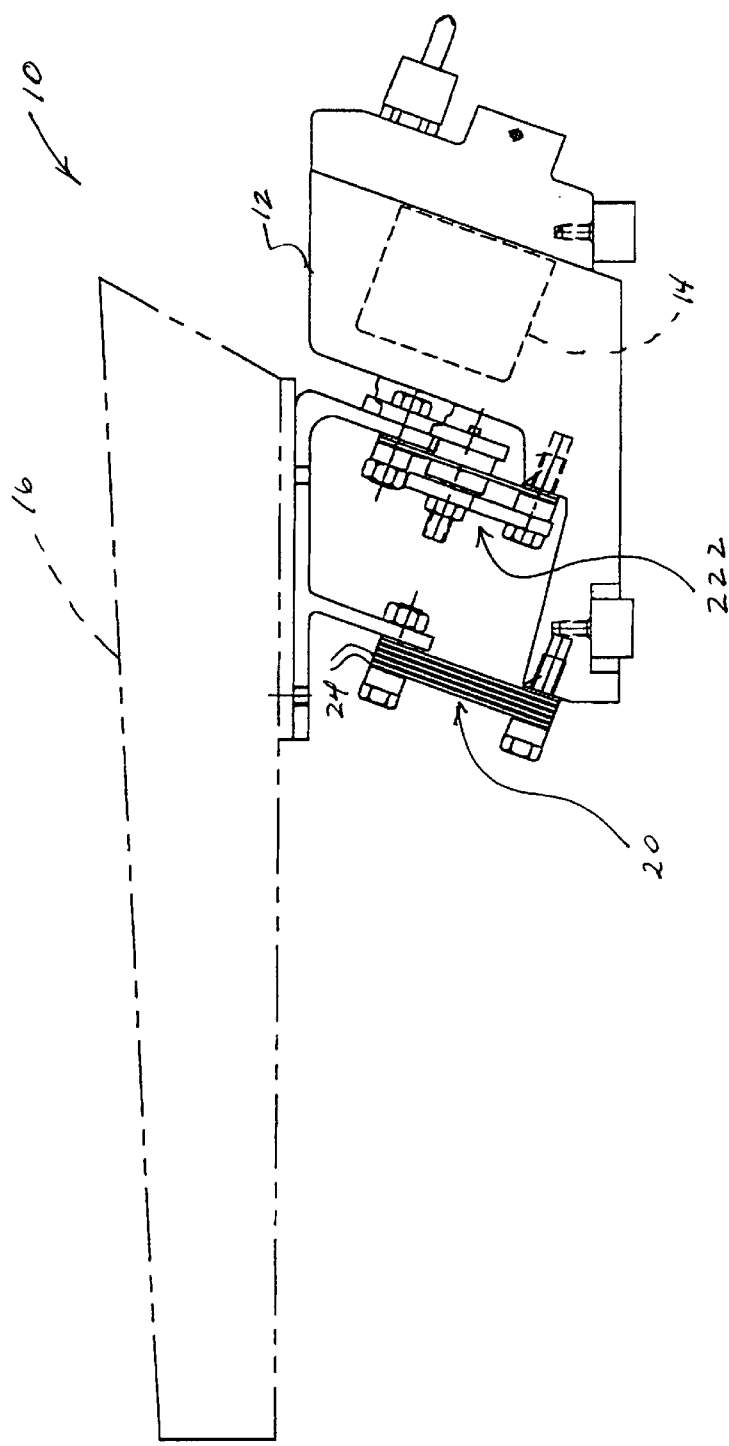
FIG_10

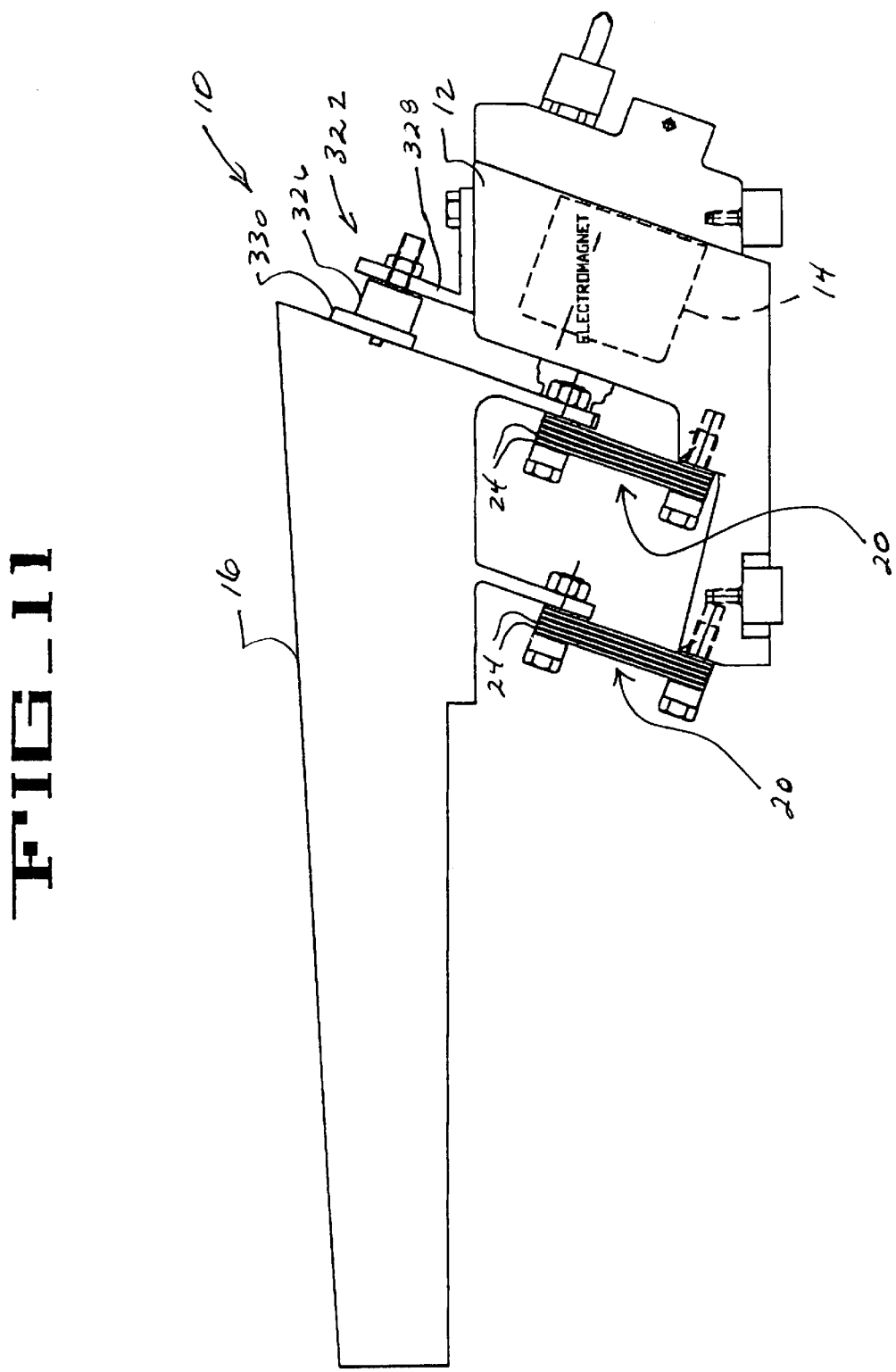
FIG_11

VIBRATORY APPARATUS HAVING ADJUSTABLE SPRING ASSEMBLY

BACKGROUND OF THE INVENTION

The present invention relates generally to vibratory conveying devices, and more particularly to a vibratory conveying apparatus having a selectively adjustable spring assembly which facilitates tuning of the apparatus for specific applications.

TECHNICAL FIELD

Vibratory conveying devices are employed in a wide variety of material-handling applications, such as for handling food products, particulate material, small parts, and other applications which do not lend themselves to use of belt-type conveyors. These types of conveying devices operate by creating vibratory motion in a bed-like conveyor trough, either by operation of mechanical or electromagnetic drives.

In a typical vibratory conveyor having an electromagnetic drive, one or more spring assemblies, typically comprising leaf springs, operatively support the vibrating trough of the device on an associated base which typically houses the electromagnetic drive. Reciprocating, vibratory motion is imparted to the trough by the electromagnetic drive, with the one or more spring assemblies of the device arranged to permit angular, vibratory movement of the trough. In this manner, material in the trough is conveyed as it is moved angularly upwardly during movement of the trough by the vibratory drive, with the trough then moved rearwardly beneath the material.

Several factors typically affect the vibrational operation of this type of conveying apparatus. The ratio of "trough side weight" (the weight of the trough plus the material therein) to "base side weight" (the weight of the supporting base structure) affects tuning of the apparatus, as does changes in the spring rate of the leaf springs which support the trough on the base. Operational tuning can also be effected by altering the "air gap" of the electromagnetic drive of the device, which effectively alters the vibrational stroke of the drive, typically on the order of 0.025 inches to 0.25 inches.

While the above techniques are well-known for tuning a vibratory conveying apparatus for optimal conveying efficiency, adjustment of weight ratios, air gaps, and spring rates have heretofore typically required that components of the apparatus be adjusted or altered, detracting from efficient tuning. Additionally, tuning techniques typically employed heretofore frequently require that a conveyor be especially configured for a given application, thus detracting from efficient manufacture of conveyors for varying applications.

The present invention contemplates an arrangement to facilitate efficient tuning of a vibratory conveyor by providing at least one adjustable spring assembly operatively connecting the base of the conveyor with an associated vibratory trough.

SUMMARY OF THE INVENTION

A vibratory conveying apparatus embodying the principles of the present invention is configured to include at least one adjustable spring assembly operatively connecting a base of the conveyor with the associated feed trough. By this arrangement, the effective spring rate of the adjustable spring assembly can be selectively varied, which permits efficient adjustment of the operational characteristics of the conveyor, including the conveyor stroke, without variation in the associated electromagnetic drive of the conveyor. This facilitates use of the conveyor for conveying differing types of material, and can even accommodate adjustment of the conveyor's operating characteristics for accommodating variations in the frequency of the power supplied to the electromagnetic drive of the conveyor.

In accordance with the illustrated embodiment, a vibratory conveying apparatus embodying the principles of the present invention includes a base, and a trough, and at least one spring assembly which mounts the trough on the base for vibratory conveyance of material in the trough.

An adjustable spring assembly in accordance with the present invention can be provided in a variety of configurations, with each configuration facilitating use with conventionally structured vibratory conveying devices. In the illustrated embodiments, the adjustable spring assembly includes a lower arm connected to the base of the conveying apparatus, and an upper arm connected to the trough of the device. An adjustable spring element mounted between the upper and lower arms can be adjusted to selectively vary the spring rate of the adjustable spring assembly, thereby altering the vibratory characteristics of the trough, without adjustment of the associated electromagnetic drive. Use of an adjustable compression spring is presently preferred, with illustrated embodiments including an elastomeric compression spring and a coil compression spring.

In certain embodiments, the adjustable spring assembly of the present invention includes a stack of leaf springs, with the adjustable compression spring of the assembly positioned on one side of the leaf spring stack. In other embodiments, the adjustable spring assembly includes a pair of leaf springs, with the adjustable compression spring positioned between the pair of leaf springs.

In the illustrated embodiments, the trough of the conveying apparatus is mounted and supported by a pair of spring assemblies, with one of the assemblies being positioned proximally of the electromagnetic vibratory drive, and the other of the assemblies being positioned distally of the vibratory drive. In accordance with the present invention, the adjustable spring assembly can be positioned proximally of the drive, or distally of the drive. In a further embodiment, each of the illustrated pair of leaf spring assemblies is non-adjustable, with an adjustable spring assembly positioned between an upwardly facing surface of the conveyor base, and a generally rearwardly facing side wall of the conveyor trough.

Other features and advantages of the present invention will become readily apparent from the following detailed description, the accompanying drawings, and the appended claims.

BRIEF DESCRIPTION OF THE DRAWINGS

FIG. 1 is a diagrammatic, side-elevational view of a vibratory conveying apparatus embodying the principles of the present invention;

FIG. 2 is an enlarged, diagrammatic side-elevational view of an adjustable spring assembly of the conveying apparatus shown in FIG. 1;

FIG. 3 is a view of the adjustable spring assembly of FIG. 2 taken along lines 3—3 of FIG. 2;

FIG. 4 is a diagrammatic, side-elevational view illustrating an alternate embodiment of the present conveying apparatus;

FIG. 5 is a diagrammatic, side-elevational view illustrating a further embodiment of the present conveying apparatus;

FIG. 6 is a diagrammatic, side-elevational view illustrating a further embodiment of the present conveying apparatus;

FIG. 8 is an enlarged, diagrammatic, side-elevational view of an adjustable spring assembly of the conveying apparatus illustrated in FIG. 7;

FIG. 9 is a view of a the adjustable spring assembly of FIG. 8 taken along lines 9—9 of FIG. 8;

FIG. 10 is a diagrammatic, side-elevational view of a further embodiment of the present conveying apparatus; and FIG. 11 is a diagrammatic, side-elevational view of a further embodiment of the present invention.

DETAILED DESCRIPTION

Figure 7:
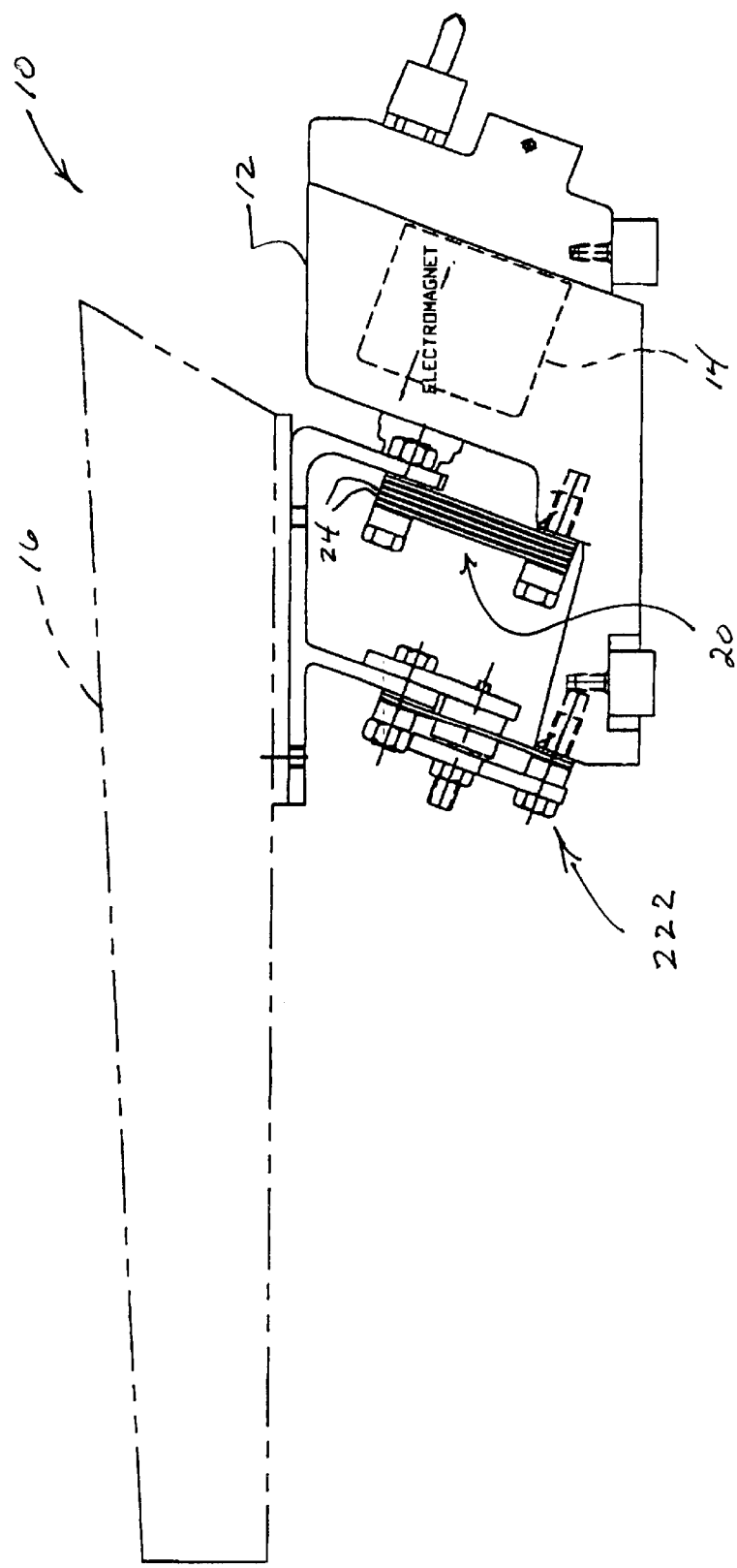
FIG. 7 is a diagrammatic, side-elevational view illustrating a further embodiment of the present conveying apparatus.

While the present invention is susceptible of embodiment in various forms, there is shown in the drawings, and will hereinafter be described, presently preferred embodiments, with the understanding that the present disclosure is to be considered as an exemplification of the invention, and is not intended to limit the invention to the specific embodiments illustrated.

The present invention is directed to a vibratory conveying apparatus, sometimes referred to as a vibratory feeder, which includes a spring mounting system including at least one adjustable spring. assembly. By this arrangement, the vibratory conveyor can be very efficiently "tuned", as may be required for handling different types of material, without necessarily varying the power supply of the electromagnetic drive of the apparatus, and without resort to adjustment of the "air gap" of the vibratory drive. In certain embodiments, the adjustable spring system desirably acts to decrease the deceleration time of the vibratory trough of the apparatus, which desirably acts to terminate vibratory movement, and thus material conveyance, more quickly than conventional arrangements.

By changing the effective spring rate contained in a tuned vibratory machine, the present invention facilitates cost-effective use by avoiding the need to provide an adjustable air gap for the vibratory drive of the device. This desirably acts to lower manufacturing costs, and additionally greatly simplifies the tuning process in end-user installations. Because air gaps may be fixed, it is possible to maintain a relatively constant current, and thus operate with the lowest possible power consumption. As will be described, spring rate adjustment can be effected without disassembly, and with minimal or no use of tools, depending on the specific application.

With reference to FIG. 1, therein is illustrated a vibratory conveying apparatus 10 embodying the principles of the present invention. The conveying apparatus includes a base 12 which houses an electromagnetic drive 14 which induces a vibratory (i.e, reciprocating) motion in the associated conveying trough 16, via trough bracket 18. The "stroke" of the electromagnetic drive 14 is typically altered by adjustment of the air gap of the drive, with the frequency of current supplied to the drive acting to alter its vibratory rate.

In order to permit vibratory movement of the conveying trough 16, the trough is mounted on the base 12 by at least one spring assembly which supports the trough for vibratory conveyance of material therein. In accordance with the present invention, the illustrated embodiment includes a non-adjustable spring assembly 20, and an adjustable spring assembly 22. In this illustrated embodiment, each of the spring assemblies 20, 22 includes a plurality of leaf springs 24 arranged in a stack. Leaf springs 24 are typically formed from fiberglass, and may be separated by suitable spring spacers, typically formed from phenolic resin. Each spring assembly 20, 22 is respectively connected to the trough bracket 18 and the base 12 of the conveying apparatus by suitable threaded mechanical fasteners.

By the angular orientation of the spring assemblies 20,22, vibratory motion in the conveying trough 16 is induced at an acute angle (typically 20 degrees) to the generally horizontal base of the trough. By this arrangement, material is conveyed by inducing motion both horizontally and vertically, with material thereby being conveyed along the trough, generally away from the base 12, referring to the orientation of the illustrated embodiment.

With particular reference to FIG. 2, adjustable spring assembly 22 includes an adjustable rate compression spring positioned at one side of the stack of leaf springs 24. In particular, the adjustable spring assembly 22 includes an elastomeric compression spring 26 held in captive relationship between a lower arm 28 connected to the base 12, and an upper arm 30 connected to the trough 16 via trough bracket 18. The spring assembly 22 includes an adjustment mechanism which, in the illustrated embodiment, comprises a threaded adjustment element 32 which extends through the lower arm 28 for selectively compressing elastomeric spring 26, and thus effectively altering the spring rate of the spring 26, and the spring rate of the adjustable spring assembly 22. While the specific operating parameters of the present conveying apparatus can be selected while keeping with the principles of the present invention as disclosed herein, it is presently contemplated that approximately 85–90% of the required spring force for the conveying apparatus be provided by the leaf springs 24, with the final 10–15% being provided by the adjustable compression spring 26 of the adjustable spring assembly.

As will be recognized, the illustrated embodiment of conveying apparatus includes a pair of leaf spring assemblies 20, 22, with one of the assemblies being positioned proximally of the vibratory drive 14, and the other of the assemblies being positioned distally of the vibratory drive. In the embodiment illustrated in FIG. 1, the adjustable spring assembly 22 is positioned distally of the vibratory drive 15. In contrast, the embodiment of the present invention illustrated in FIG. 4 shows the vibratory conveying apparatus 10 configured such that the adjustable spring assembly 22 is positioned proximally of the vibratory drive 14.

With reference now to FIG. 5, therein is illustrated a further alternate embodiment of the present conveying apparatus 10, wherein the apparatus includes an adjustable spring assembly 122, positioned distally of the associated conveyor drive 14. Adjustable spring assembly 122 is configured similarly to previously-described adjustable spring assembly 22, but with spring assembly 122 including a coil compression spring 126 held captive between lower arm 28 and upper arm 30, with a threaded adjustment member 32 providing for selective adjustment of the compression coil spring 126 by compressing the spring.

With reference to FIG. 6, therein is illustrated an embodiment of the present conveying apparatus 10, wherein the adjustable spring assembly 122, including coil compression spring 126, is positioned proximally of the associated conveyor drive 14.

With reference now to FIGS. 7, 8, and 9, therein is illustrated a further alternate embodiment of the present invention, wherein vibratory conveying apparatus 10 includes a differently configured adjustable spring assembly 222. In this embodiment, adjustable spring assembly 222 is positioned distally of the associated conveyor drive 14, and includes an arrangement of cooperating leaf springs and an elastomeric compression spring. With particular reference to FIG. 8, the adjustable spring assembly includes a pair of leaf springs 224, arranged in parallel, which are respectively connected to the trough bracket 18 and conveyor base 12 with suitable mechanical fasteners, as illustrated. The adjustable spring assembly 222 further includes an elastomeric compression spring 226 positioned between leaf springs 224, with spring 226 held in captive relationship between a lower arm 228 and an upper arm 230 respectively connected to the base 12 and the bracket 18 of the conveyor trough. A threaded adjustment member 232, with a suitable locking nut 234, is provided for selectively compressing and varying the effective spring rate of the elastomeric compression spring 226, thereby selectively varying the effective spring rate of the adjustable spring assembly 222.

The embodiment of the present conveying apparatus 10 illustrated in FIG. 10 includes an adjustable spring assembly 222 as in the previously described embodiment, with this embodiment configured such that the adjustable spring assembly is positioned proximally of the associated conveyor drive 14.

FIG. 11 illustrates a further alternative embodiment of the present conveying apparatus 10, wherein the conveyor trough 16 is supported by a pair of non-adjustable spring assemblies 22, each comprising a plurality of leaf springs 24 arranged in a stack, with the apparatus further including an adjustable spring assembly 322 for mounting the trough 16 on the conveyor base 12. In this embodiment, an elastomeric compression spring 326 is held in captive relationship between a lower arm 328, connected to an upwardly facing surface of base 12, and an upper arm 330 connected to a generally rearwardly facing sidewall of the trough 16. A threaded adjustment member 332, secured with a suitable locking nut 334, acts to selectively compress and thus vary the spring rate of the elastomeric compression spring 326, thus varying the effective spring rate of the adjustable spring assembly 322.

As will be appreciated from the foregoing description, a vibratory conveying apparatus embodying the principles of the present invention can be provided in any of a variety of configurations, with an adjustable spring assembly of the apparatus being configured and positioned as may be required for various specific applications. As will be appreciated, while the present invention has been illustrated in connection with a so-called linear conveying apparatus or vibratory feeder, it is within the purview of the present invention that the conveying apparatus including an adjustable spring assembly can be configured as a rotary vibratory feeder. The adjustable spring of the adjustable spring assembly of the apparatus may be constructed of varying materials that may have spring rates that are linear of nonlinear, as may be required. The adjustable spring may be designed to be compatible with a wide range of applications, such as high-temperature applications, corrosive environments, and those environments configured in accordance with Food and Drug Administration requirements for food handling and the like.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A vibratory conveying apparatus, comprising:

a base;

a trough;

at least one leaf spring assembly, comprising a plurality of leaf springs, mounting said trough on said base, and at least one adjustable spring assembly mounting said trough on said base for vibratory conveyance of material in said trough;

said adjustable spring assembly including a lower arm connected to said base, an upper arm connected to said trough, and an adjustable spring element mounted between said upper and lower arms which can be adjusted to selectively vary the spring rate of said spring assembly, one of said upper and lower arms includes an adjustment mechanism for adjusting the compression spring force of said compression spring, said adjustable spring element comprising an adjustable compression spring.

2. A vibratory conveying apparatus in accordance with claim 1, wherein:

said adjustable spring assembly further comprises a plurality of leaf springs respectively connected to each of said base and said trough.

3. A vibratory conveying apparatus in accordance with claim 1, wherein:

said adjustable compression spring comprises an elastomeric spring.

4. A vibratory conveying apparatus in accordance with claim 1, wherein:

said lower arm is connected to an upwardly facing surface of said base, and said upper arm is connected to a sidewall of said trough.

5. A vibratory conveying apparatus, comprising:

a base carrying a vibratory electromagnetic drive;

a trough mounted on said base and connected to said vibratory drive for vibratory conveyance of material in said trough; and a plurality of leaf spring assemblies for mounting said trough on said base, at least one of said spring assemblies have an adjustable spring rate to selectively adjust the vibratory movement of said trough, said one of said spring assemblies having said adjustable spring rate comprises a captively held compression spring, and a threaded adjustment mechanism for adjusting the compressive spring force of said compression spring.

6. A vibratory conveying apparatus in accordance with claim 5, wherein:

said trough is supported on said base by a pair of said leaf spring assemblies, one of said assemblies being positioned proximally of said vibratory drive, and the other of said assemblies being positioned distally of said vibratory drive.

7. A vibratory conveying apparatus in accordance with claim 6, wherein:

said proximally positioned one of said spring assemblies has said adjustable spring rate.

8. A vibratory conveying apparatus in accordance with claim 6, wherein:

said distally positioned one of said spring assemblies has said adjustable spring rate.

9. A vibratory conveying apparatus in accordance with claim 5, wherein: said one of said spring assemblies further comprises a plurality of leaf springs.

10. A vibratory conveying apparatus in accordance with claim 9, wherein:

said leaf springs are arranged in a stack, and said compression spring is positioned on one side of said stack of leaf springs.

11. A vibratory conveying apparatus in accordance with claim 9, wherein:

said leaf springs are arranged in parallel, and said compression spring is positioned between said leaf springs.

12. A vibratory conveying apparatus, comprising:

a abase;

a trough; and at least one spring assembly mounting said trough on said base for vibratory conveyance of material in said trough;

said spring assembly including a lower arm connected to said base, an upper arm connected to said trough, and an adjustable spring element mounted between said upper and lower arms which can be adjusted to selectively vary the spring rate of said spring assembly, said spring assembly further comprises a plurality of leaf springs respectively connected to each of said base and said trough.

13. A vibratory conveying apparatus in accordance with claim 12, wherein:

said adjustable spring element comprises an elastomeric spring.

14. A vibratory conveying apparatus in accordance with claim 13, wherein:

one of said upper and lower arms includes an adjustment mechanism for adjusting the compression spring force of said elastomeric spring.

* * * * *